April 24, 1951
L. C. BARLING
2,550,441
AUTOMATIC VALVE
Filed Aug. 27, 1948
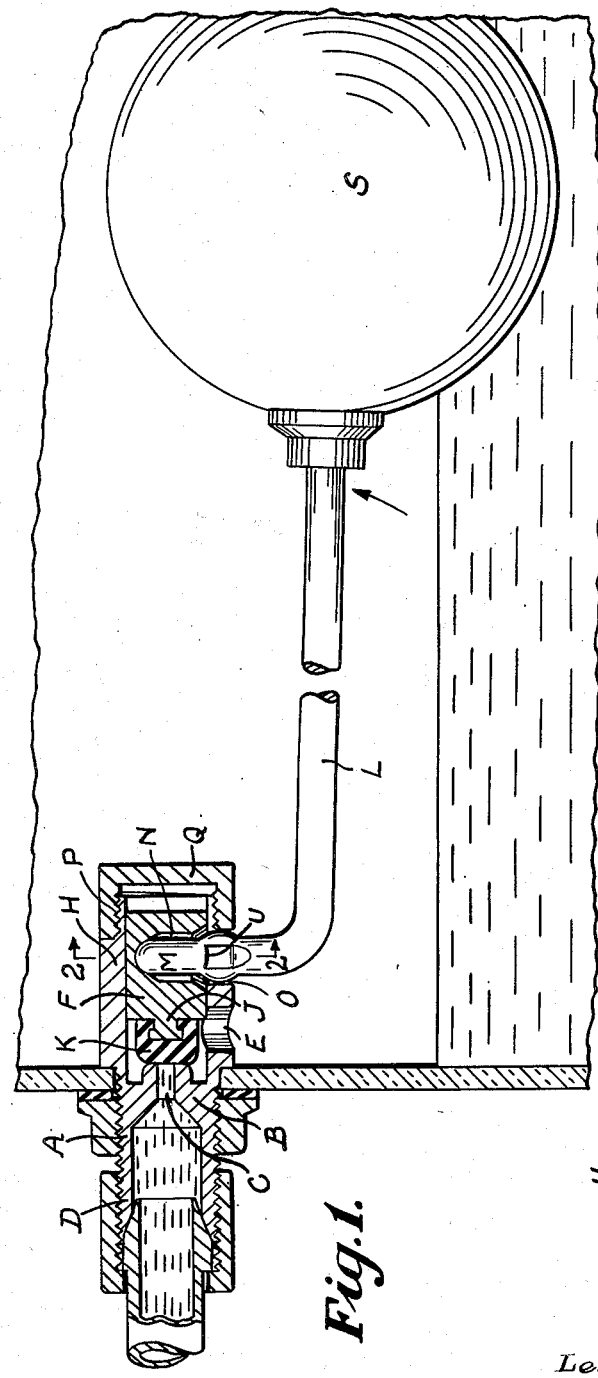
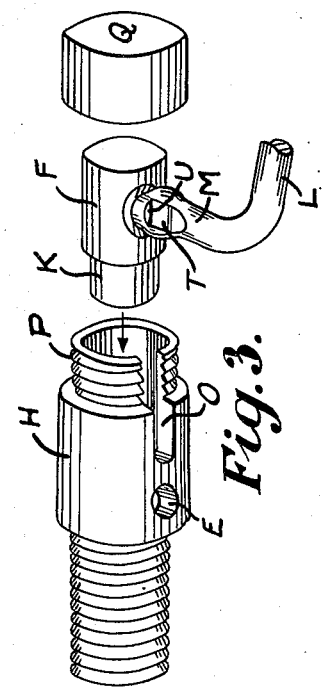
Inventor
Leslie Clement Barling
By
Munn, Liddy & Glaccum
Attorneys Patented Apr. 24, 1951

2,550,441

UNITED STATES PATENT OFFICE 2,550,441

AUTOMATIC VALVE

Leslie C. Barling, Johannesburg, Transvaal, Union of South Africa

Application August 27, 1948, Serial No. 46,425
In the Union of South Africa April 7, 1948

2 Claims. (Cl. 137—104)

This invention relates to automatic valves of the type used for admitting a predetermined quantity of liquid to a container. Such valves are employed, for example, in domestic water closet cisterns where they are actuated by means of a lever arm having a floating ball at the free extremity thereof. When the level of the water in the cistern falls, the ball falls also, thus causing the valve to open and admit a fresh supply of water. When the volume of water so admitted has raised the level in the cistern to a predetermined extent, the position of the floating ball is such that it causes the valve to close automatically.

Valves as described above usually comprise a horizontal body part having a closure member adapted for reciprocating movement therein. The body part is provided with a depending flange on which the actuating lever is pivotally mounted and a projection on said actuating lever is arranged to cooperate with the closure member for the purpose of imparting reciprocating movement thereto. The actuating lever itself moves through the arc of a circle.

It is an object of the present invention to provide a valve of the type described which shall be capable of being actuated by means of a float member of considerably smaller dimensions than is customarily used at present.

It is a further object of the invention to provide a valve which is easy and cheap to mass-produce and which can be assembled or dismantled with a minimum of effort.

In accordance with the invention, an automatic valve of the type described comprises a body part of circular or other cross-section having an inlet thereto and an outlet therefrom for liquid, a closure member pivotally mounted on one end of an actuating lever and arranged for reciprocating movement within said body part so as to prevent or permit flow of liquid from said inlet to said outlet as may be required, said body part being provided with an aperture in the wall thereof through which the actuating lever passes and which holds the same acting as a bearing for the said lever without the employment of a pivotal pin, and a floating member associated with the end of said lever remote from said body part.

The said aperture advantageously takes the form of a longitudinal slot in the wall of the body part, the said slot being open at that end of the wall remote from the inlet for liquid for insertion of the actuating lever.

The rear section of the slot is closed by a closure cap for the valve which is screwed on to the end of its body.

An important feature of the present invention is the design of the pivotal device for the actuating lever.

In the region of pivoting of the actuating lever the diameter of the rod is reduced in transverse direction whereas in fore and aft direction the width of the rod is increased.

The pivotal points of the lever are situated on the points of contact between the circumference of the bulge in fore and aft direction created on the rod by the said increase in width, and the end of the slot and the face of the cap, depending on the movement of the lever. The limits of arcuate movement are determined in the forward movement of the plunger by contact of the valve cap with the valve seat, and in the backward movement by the front face of the actuating arm coming into contact with the inside face of the plunger hole.

By reduction of the diameter of the rod, flat faces are formed in a longitudinal direction so that the rod fits into the slot, any considerable transverse swinging movement of the arm being thereby prevented. At the upper extremity of the flat faces, shoulders are formed, said shoulders being radiused to conform with the movement of the arm and to prevent the lever from dropping out.

The aforesaid design effectually overcomes any tendency to jam.

A preferred embodiment of the invention will be further illustrated with reference to the accompanying drawing, though it should be understood that the invention is not limited by the example given.

Fig. 1 shows a section through a cistern, and more particularly a linear section of the valve.

Fig. 2 is a cross-section on the line 2—2.

Fig. 3 shows the manner in which essential parts of the valve may be assembled.

Like parts are denoted by the same legends in the different figures.

Referring to Figs. 1 and 2 of the drawing, the body part A is tubular and provided centrally with a transverse partition B pierced by a small axial bore C. One end of said body part D is threaded externally for connection to the water supply. On the side of the partition remote from the water inlet to the body, a radial outlet E for the water is provided. A closure member comprising a plunger F is adapted to be received and is a close fit within that portion of the body part H remote from the water inlet. An axial spigot J projects from the internal face of said plunger and on it is mounted a rubber cap K of smaller diameter than the plunger which effectively seals off the axial bore when the valve is closed. The cap K may also be made of any other suitable resilient material. A radial hole N is drilled from the periphery of the plunger inwards towards and beyond the centre thereof.

The actuating lever L is L-shaped and its short extremity M is rounded off and adapted to be received in the base of the socket formed by the radial hole N in the plunger aforesaid, with sufficient play to allow of an easy reciprocating movement of the plunger.

Reference is now made to Fig. 3, and in some degree to Figs. 1 and 2.

A longitudinal slot O in the wall of the body part extends from the extremity remote from the inlet for liquid inwards to a point adjacent the radial liquid outlet E. Such slot O is to enable the actuating lever L with the plunger F mounted thereon to be assembled to the body part H. The end of the body part H remote from the inlet is threaded externally at P for reception of an internally threaded cap Q which, when it is secured in position, prevents withdrawal of the plunger F.

At a short distance from the point at which it projects outwards through the slot O, say an inch or so, the actuating lever L is bent at right angles and on the free extremity a floating ball S is mounted.

According to one modification of the invention, at the point where the lever L is inserted into the slot O it is narrowed to a section corresponding to that of the slot and provided with flattened faces T and T'.

Radiused shoulders U are provided which prevent the lever from dropping out and which conform to its arcuate movement. By screwing the cap Q home the assembly is secured in position. In this way a very important simplification of assembly is attained, since the use of pivot pins which are troublesome to insert is thereby obviated. Furthermore this simplifies the work of the plumber in case the valve should have to be repaired, for example, to change the rubber cap K.

The invention described above allows of a remarkable increase in leverage (the ratio of the arm L to the arm M around the fulcrum) as against that hitherto possible in practice and therefore a ball or other floating member of reduced size as compared with the devices hitherto employed will operate the valve satisfactorily.

In accordance with the present invention a leverage of 20:1 or more is preferably employed, say between 25:1 and 30:1. In practice, the leverage employed is about 27:1.

I claim:

1. An automatic valve for admitting a predetermined quantity of liquid into a container, comprising a tubular body part having a transverse partition provided with an axial bore and an inlet thereto and an outlet therefrom, a float operated actuating lever, a closure member pivotally mounted on one end portion of said actuating lever and arranged to be reciprocated within said body part so as to prevent or permit flow of liquid from said inlet through said axial bore to said outlet as may be required, the wall of said body part having a longitudinal slot therein which extends form a point on the outlet side of the transverse partition and which is open at that end of the wall remote from the inlet, said end portion of said actuating lever projecting through said slot, a removable cap attached to said body part and closing the open end of the slot thereby preventing separation of the lever endwise of the slot, said lever having flat faces which abut the sides of the slot, and said lever also having radiused shoulders at the upper extremities of said flat faces to conform with the movement of the aforesaid end portion of the lever and to prevent the lever from dropping out, the width of the lever adjacent said flat faces being increased in a fore and aft direction, and the pivotal points of the lever in the slot being the points of contact between the circumference of the bulge thus created and the end of the slot and the cap, depending upon the movement of the lever.

2. An automatic valve for admitting a predetermined quantity of liquid into a container, comprising a tubular body part having a transverse partition provided with an axial bore and an inlet thereto and an outlet therefrom, a float operated actuating lever, a closure member pivotally mounted on one end portion of said actuating lever and arranged to be reciprocated within said body part so as to prevent or permit flow of liquid from said inlet through said axial bore to said outlet as may be required, the wall of said body part having a longitudinal slot therein which extends from a point on the outlet side of the transverse partition and which is open at that end of the wall remote from the inlet, said end portion of said actuating lever projecting through said slot, a removable cap attached to said body part and closing the open end of the slot thereby preventing separation of the lever endwise of the slot, said lever having flat faces which abut the sides of the slot, and said lever also having radiused shoulders at the upper extremities of said flat faces to conform with the movement of the aforesaid end portion of the lever and to prevent the lever from dropping out, said lever being L-shape providing the aforesaid end portion which is received in a radial hole drilled from the periphery of said closure member inwards towards and beyond the center thereof, said end portion being rounded for reception in the base of the socket formed by said radial hole, with sufficient play for easy reciprocating movement of the closure member.

LESLIE C. BARLING.

REFERENCES CITED

The following references are of record in the file of this patent:

UNITED STATES PATENTS

| Number | Name | Date |
| --- | --- | --- |
| 752,314 | Tozier | Feb. 16, 1904 |
| 1,298,668 | Coakley | Apr. 1, 1919 |
| 1,982,550 | Skuttle | Nov. 27, 1934 |
| 2,057,231 | Dawson | Oct. 13, 1936 |
| 2,274,862 | Groeniger | Mar. 3, 1942 |
| 2,364,107 | Svirsky | Dec. 5, 1944 |
| 2,392,782 | Snyder | Jan. 8, 1946 |
| 2,406,914 | Sievers | Sept. 3, 1946 |

FOREIGN PATENTS

| Number | Country | Date |
| --- | --- | --- |
| 72,575 | Sweden | Sept. 1931 |
| 620,544 | Germany | Oct. 23, 1935 |